United States Patent
Defendini et al.

(10) Patent No.: US 7,249,531 B2
(45) Date of Patent: Jul. 31, 2007

(54) CONTROL MOMENT GYRO FOR ATTITUDE CONTROL OF A SPACECRAFT

(75) Inventors: Ange Defendini, Montjoire (FR); Pascal Guay, Saint-Loup Cammas (FR); Philippe Faucheux, Gagnac sur Garonne (FR)

(73) Assignee: Eads Astrium SAS, Villacoublay (FR)

( * ) Notice: Subject to any disclaimer, the term of this patent is extended or adjusted under 35 U.S.C. 154(b) by 231 days.

(21) Appl. No.: 10/508,352

(22) PCT Filed: Mar. 18, 2003

(86) PCT No.: PCT/FR03/00855
§ 371 (c)(1),
(2), (4) Date: Sep. 20, 2004

(87) PCT Pub. No.: WO03/080439
PCT Pub. Date: Oct. 2, 2003

(65) Prior Publication Data
US 2005/0109135 A1 May 26, 2005

(30) Foreign Application Priority Data
Mar. 21, 2002 (FR) .................................. 02 03569

(51) Int. Cl.
*G01C 19/04* (2006.01)
(52) U.S. Cl. .................................. 74/5.47; 74/7; 74/8

(58) Field of Classification Search ................. 74/5 R, 74/5.47, 5.7, 5.8, 5.9
See application file for complete search history.

(56) References Cited

U.S. PATENT DOCUMENTS

| 2,969,680 | A | * | 1/1961 | Linn et al. ..................... 74/5 R |
| 3,186,239 | A | * | 6/1965 | Emmerich ..................... 74/5 R |
| 3,250,134 | A | * | 5/1966 | Schept ....................... 74/5.6 E |
| 3,251,955 | A | * | 5/1966 | Erickson ................... 191/12 R |
| 6,135,392 | A |   | 10/2000 | Wakugawa |
| 6,305,647 | B1 |   | 10/2001 | Defendini et al. |

FOREIGN PATENT DOCUMENTS

| EP | 1 070 665 A1 | 1/2001 |
| FR | 98 14548 | 11/1998 |

* cited by examiner

*Primary Examiner*—Ha Ho
(74) *Attorney, Agent, or Firm*—Stites & Harbison PLLC; Ross F. Hunt, Jr.

(57) ABSTRACT

A control moment gyro comprising a wheel support structure which is mounted on a base by a motor, which is used to rotate the support around a first axis and bearing a wheel arrangement for driving the wheel spinner at a high speed around a second axis perpendicular to the first. The support structure includes a tubular part which rotates on the base and a flange which is disposed on only one side of the wheel and which is fixed both to the wheel and the tubular part. The diameter of the wheel and the point at which the wheel is fixed to the flange are proportioned such that the wheel penetrates the tubular part.

15 Claims, 2 Drawing Sheets

CONTROL MOMENT GYRO FOR ATTITUDE CONTROL OF A SPACECRAFT

FIELD OF INVENTION

The present invention relates to gyrodynes or gyroscopic actuators (often designated by the initials cmg standing for control moment gyro); they differ from the reaction wheels commonly used to control the attitude of a space vehicle and in particular of a satellite by exchange of angular momentum, in that the wheel is mounted on a support, called a gimbal, that can be oriented by at least one motor about at least one axis which is orthogonal to the axis of rotation of the wheel. In most cases the spinner of the wheel rotates at constant speed or at least has a speed that varies little during its deployment.

BACKGROUND OF THE INVENTION

The orientation of a reference trihedron tied to the body of a satellite can be controlled about three axes by a cluster of at least three gyroscopic actuators whose gimbal exhibits just one axis of orientation of the axis of the wheel; two gyroscopic actuators suffice for 2-axis control. In practice, in general at least four gyroscopic actuators are used in a cluster to ensure redundancy for 3D control. A particularly advantageous example of an attitude control system using gyroscopic actuators is given in patent FR 98 14548 or U.S. Pat. No. 6,305,647 to which reference may be made.

Most existing gyroscopic actuators have an architecture of the kind shown diagrammatically in FIG. 1. The gyroscopic actuator comprises a plinth 10 intended to be fixed to the body of the satellite. It can moreover define, with a leaktight envelope (not represented), a volume in which the active part of the actuator is placed. Mounted on the plinth is a wheel support 12 that a motor can orient on the plinth about an axis z. Hereinafter the term "wheel" 14 will designate an assembly which comprises a part secured to the support and a spinner that can rotate on the support about an axis x orthogonal to the axis z of rotation of the support. An electric motor drives the wheel, generally at constant and regulated speed.

The support, that is generally referred to as a gimbal, although it can only orient the axis of the wheel about a single axis, generally exhibits an annular shape centered on the z axis. It completely surrounds the wheel or spinner. Consequently, the assembly occupies a considerable volume and has a high mass for given maximum angular momentum and rigidity. Now, due to the constraints encountered on board a satellite, the space required for the gyroscopic actuators and their mass must be reduced as much as possible for given angular momentum capacity.

SUMMARY OF THE INVENTION

The present invention is aimed in particular at providing a gyroscopic actuator having a reduced mass and requiring a reduced space, having a high overall structural rigidity, able to be embodied in a form facilitating the construction of the interfaces with the body of the satellite and the integration of the assembly.

The invention proposes in particular, for this purpose, a gyroscopic actuator comprising a wheel support structure mounted on a plinth by means making it possible to rotate it about a first axis and carrying a wheel equipped with means making it possible to drive the spinner of the wheel at high speed about a second axis orthogonal to the first, characterized in that the support structure comprises a tubular piece rotating on the plinth and a flange placed on one side of the wheel and fixed on the one hand to the wheel and on the other hand to the tubular piece, the diameter of the wheel and the location of fixing of the wheel to the flange being proportioned in such a way that the wheel penetrates axially into the tubular piece, and possibly into the plinth.

By virtue of this arrangement, it is possible to reduce the space required along the axis of rotation of the gimbal since the wheel penetrates inside the tubular piece and often also the plinth. The space required for play and the footprint on the satellite are also reduced since the diameter of the support structure is equal to the diameter of the wheel and the diameter of the plinth can be markedly less than the diameter of the wheel.

The flange advantageously has the general shape of an angular fraction of a truncated cone whose wider end part is fixed to the tubular piece and whose narrower end part carries the wheel.

The flange can exhibit a semicylindrical part for fixing the wheel (on the side of the narrower end face) and a rim for fixing onto the tubular piece (on the side of the wider end part).

The flange advantageously exhibits internal ribs giving it a high rigidity, making it possible to bring the first overall mode of vibration of the structure to a high value, for a given mass, in particular beyond 100 Hertz. These ribs can comprise two partitions disposed at 90° to one another, one facing the wheel, the other perpendicular to the first.

The tubular piece—that will subsequently sometimes be referred to as the "cone", exhibits a first fraction, advantageously in the shape of a truncated cone whose large base is fixed to the flange. This conical shape participates in the high rigidity of the support structure. The large diameter part of the cone advantageously carries the rotor of the motor for orienting the support structure, that is to say the gimbal. The cone proper is advantageously extended by a tubular part which carries in succession the rotating part of a bearing for mounting on the plinth, the rotating part of an angular coder and a part of means for transferring power and signals between the support structure and the plinth. The tubular part extending the cone advantageously exhibits several cylindrical portions of diameters that decrease from the level of the bearing up to the level of the transfer of power and of signals.

BRIEF DESCRIPTION OF THE DRAWINGS

The above characteristics as well as others will become better apparent on reading the description which follows of a particular embodiment of the invention, given by way of nonlimiting example. The description refers to the drawings which accompany it, in which.

DESCRIPTION OF THE PREFERRED EMBODIMENTS

Figure 2:
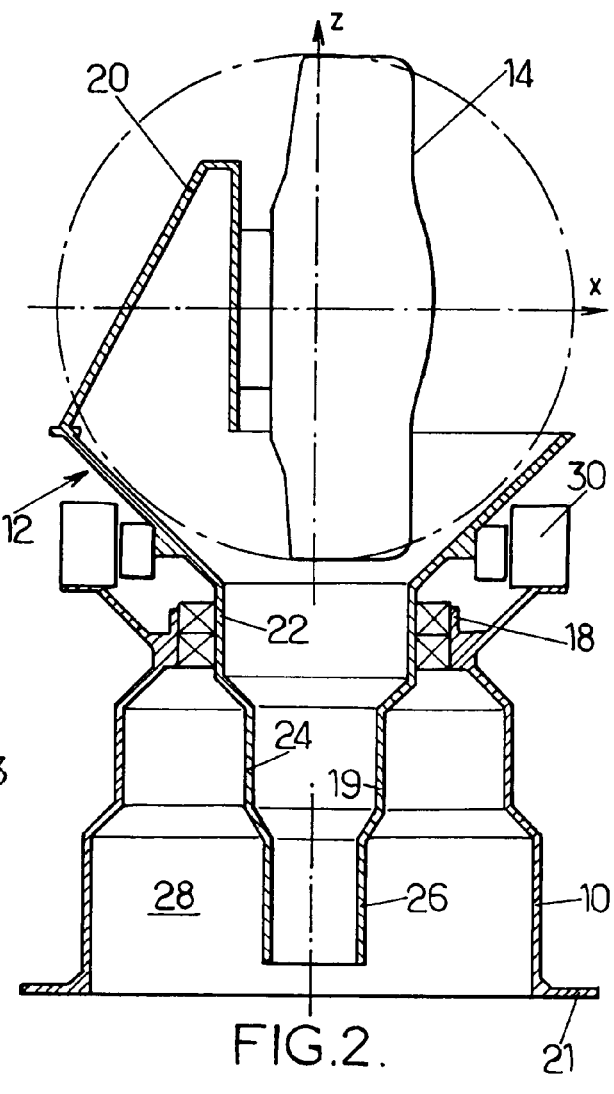
FIG. 2 is a basic representation of a gyroscopic actuator according to an embodiment of the invention, in section through a plane passing through the axis of the gimbal.

In FIG. 2, which shows the basic architecture of an actuator, there is a plinth 10 which during use can be in any orientation, on which a support structure 12 to which the wheel 14 is fixed rotates. The support structure is in several assembled pieces. These pieces comprise a tubular piece 19 (at the bottom in FIG. 2) whose top part is truncated cone shaped, carried on the plinth 10 by a bearing 18, and a flange 20 placed on one side of the wheel and fixed on the one hand to the nonrotating part of the wheel, and on the other hand to the tubular piece. The diameter of the wheel 14, the relative dimensions of the support structure 12 and of the plinth 10 and the location at which the wheel is fixed on the flange are proportioned in such a way that the wheel projects into the tubular piece and that the volume swept by the wheel when operational (indicated by broken lines) does not have a diameter about the axis z greater than that of the rim 21 of the plinth. Thus the space required is minimized on account of the penetration of the cantilevered mounting and of the penetration of the wheel into the gimbal.

The tubular piece 19 comprises, in addition to a truncated cone shaped fraction whose large base is fixed to the flange, a tubular extension exhibiting a stepped shape, with diameters that decrease progressively from the truncated cone to the bottom end. A first cylindrical span 22 is secured to the rotating part of the bearing 18 whose fixed part is mounted on the plinth 10. The second span 24, of smaller diameter than the first, carries the rotating part of an angular coder (not represented). Finally, a third span 26 exhibits, in the case of FIG. 2, an even more reduced diameter so as to leave free, between this span and the bottom part of the plinth 10, an annular zone 28 of sufficient dimension to house therein means for transferring signals and power by flexible cable, winder or rotating commutator.

Figure 3:
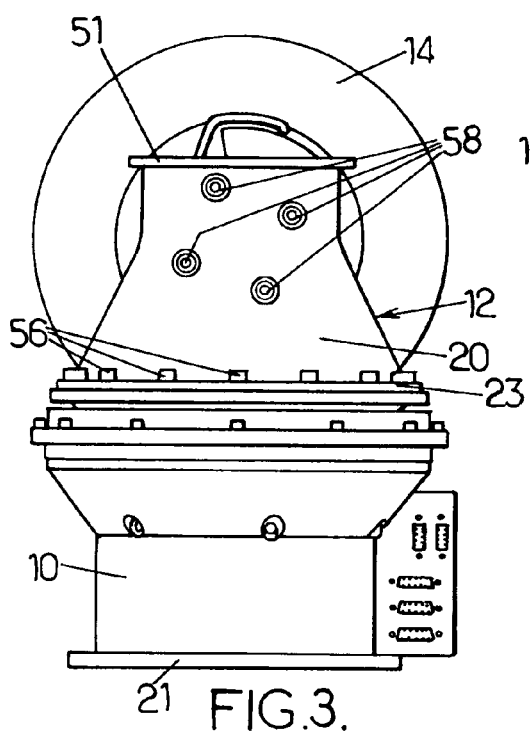
FIG. 3 is a view in elevation of a gyroscopic actuator having the basic construction shown in FIG. 2.
Figure 4A:
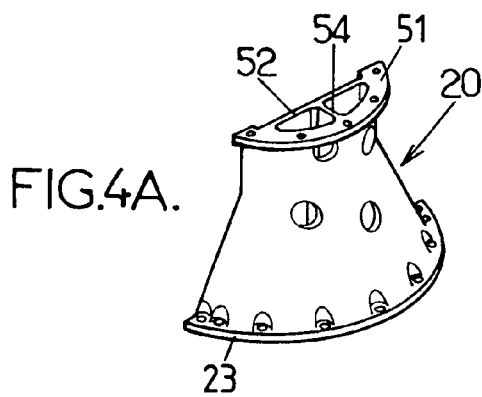
FIGS. 4A and 4B are two perspective views of the flange of the actuator of FIG. 3.
Figure 4B:
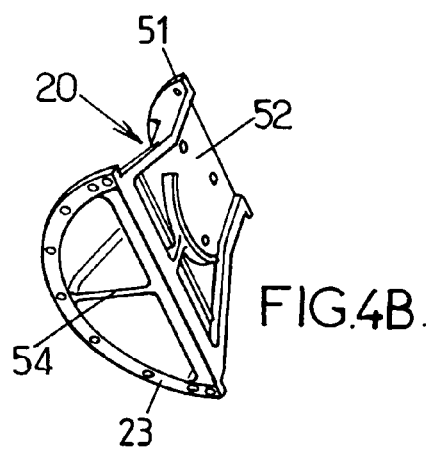

The construction of the particular embodiment illustrated by way of example in FIG. 3 et seq. will now be described, where the elements corresponding to those of FIG. 2 bears the same reference number.

The plinth 10 exhibits a bottom cylindrical part furnished with the rim 21 and a top flared part, which carries the stator of the electric motor 30 for orienting the gimbal. This motor 30 is for example a torque motor with permanent magnets, which is controlled by a control loop whose input is linked to an outside system. This torque motor can be replaced with a stepper motor.

In a particular embodiment the bearing 18 (FIG. 2) comprises a set of two aligned journals, mounted back to back. These journals can in particular consist of ball or roller bearings. In the latter case, the circle of balls of each journal is devised in such a way as to be supported obliquely on the rings, so that the forces exerted on the balls occupy the generatrices of a cone. By virtue of the mounting of two bearings back to back, the vertices of the two cones can be distanced from one another, for example, one at the level of the center of the wheel and the other inside the zone 28. Through an appropriate choice of the diameter of the bearings and of the angle of contact (angle between the direction of support of the balls and the rings of the bearing), it is possible to achieve the best possible compromise between the picking up of the loads during launch, the reducing of friction during in-flight use and the volume occupied by the bearing as a whole.

The angular position of the gimbal is given at any instant by the coder exhibiting a part fixed rigidly to the plinth 10 and a rotor part linked to the support structure.

It is in particular possible to use an optical coder, with incremental output in the form of quadrature signals that can be processed by proximity electronics capable of operating in fine pointing mode.

An optical coder exhibits numerous advantages relative to electrical coders such as resolvers. It makes it possible to obtain high accuracy. It is possible to obtain accuracy of better than plus or minus three seconds of angle, amply sufficient for satisfactory positioning of the angular momentum.

The means for passing the measurement signals and the power supply, controlled from outside, have to tolerate the rotation of the gimbal, at least within a limited angular domain.

As indicated earlier, it is possible to use a rotating connector with rings and brushes. It has the advantage of not limiting the rotation of the gimbal, but the drawback of a frictional torque that may become high when the number of signals to be transferred is considerable. Another advantage of transmission by rings and brushes is the fact that the wheel can be allowed to drift freely in rotation during the launch phase.

It is also possible to use means for passing signals by multiconductor flexible cable and cable winder. Customary cable winders comprise a flexible cable containing a bundle of conductors, linking two drums that can rotate with respect to one another. Each end of the cable is fixed to one of the drums and the cable winds up and unwinds when the drums rotate with respect to one another. The frictional torque of such a winder is much smaller than that of a rotating connector and the contacts are better.

The flange 20 exhibits, in the case illustrated, a complex shape. It consists of a single piece for reasons of rigidity and robustness. Its outside surface takes the form of an angular sector of a surface of revolution. It has a truncated cone shaped fraction, ending in the rim 23 for fixing onto the tubular piece and a semicylindrical fraction also furnished with a reinforcing rim 51.

To give the flange 20 high rigidity for low weight, the lateral wall of the flange is reinforced by ribs. These ribs comprise a partition 52, linking the edges of the flange, and a partition 54 orthogonal to the first, placed in the mid-plane of the flange. The flange is fixed to the tubular piece by a row of regularly distributed screws 56.

The casing of the wheel 14 is fixed to the flange by four screws 58 offset with respect to the mid-plane of the flange, so as to be close to the stiffening ribs. The wheel can have a construction of known type. For example, it comprises a leaktight casing and a spinner. The casing is furnished with a support plate which carries the bearings on which the spinner rotates, the stator of the spinner drive motor and a tachometer. The internal construction of the wheel will not be described in detail since it may be of known type.

In a general manner, the spinner is rotated at high speed, generally constant. The spinner drive motor comprises, for example, a torque motor with no brushes and no iron, generally electronically switched, whose torque compensates for the frictional energy dissipations.

During operation, it is necessary to remove the heat dissipated, in particular by the motors, and that due to the friction without excessive heating and without excessive thermal gradient in components that are sensitive thereto. Additionally, it is advisable to seek good compatibility of the thermal expansion coefficients of the various components.

In a satellite, thermal dissipation can occur only by conduction or by radiation to the cold wall of the body of the satellite. The flange 20 is interposed between the wheel and the wall. It can be constructed from a good heat conducting material, such as aluminum, and its external face can be blackened to improve emission. To decrease the thermal gradient in the bearings of the gimbal, the cone is advantageously made of a material having low conductivity, such as titanium.

Figure 5:
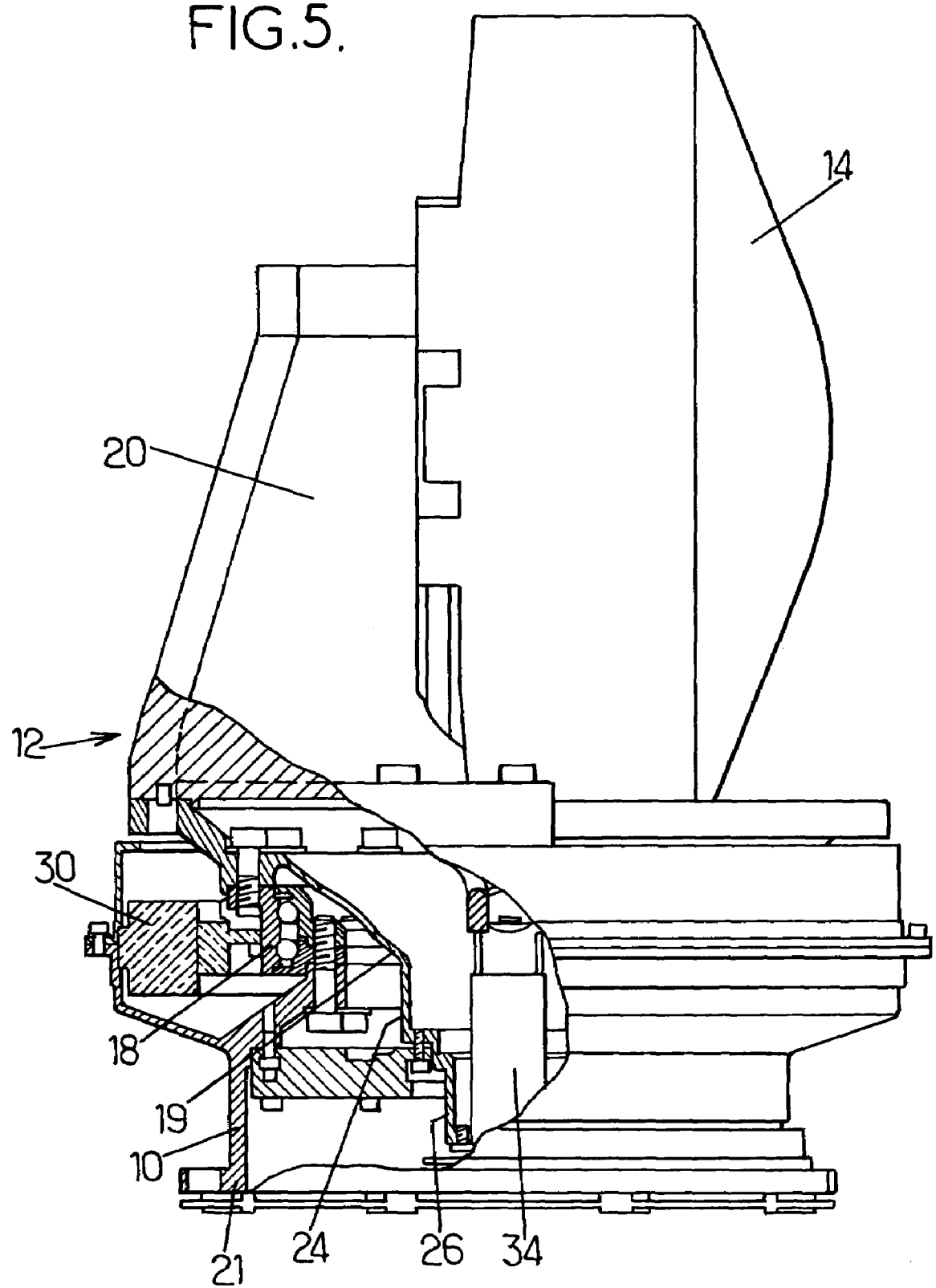
FIG. 5 is a view in elevation and a partial sectional view of an actuator according to a variant embodiment.

FIG. 5, where the components corresponding to those of FIGS. 2 to 4B are designated by the same reference number, shows a variant embodiment. This variant is more suited than the previous embodiment to the use of a thick wheel, that is to say of a wheel whose thickness/diameter ratio is increased.

In this case, the penetration of the wheel 14 into the cone of the tubular piece 19 is reduced and there is no penetration of the wheel into the plinth 10.

The arrangement shown in FIG. 5 makes it possible moreover for the vertical space required to be less than that of an actuator exhibiting the construction shown in FIG. 2. The bearing 18 and the motor 30 are placed substantially at the same height, coaxially with one another. The means for transferring signals and power to the outside comprise a rotating commutator with ring 34, placed inside the spans 24 and 26 of the tubular piece 19. An optical sensor is then placed under the span 26.

Figure 1:
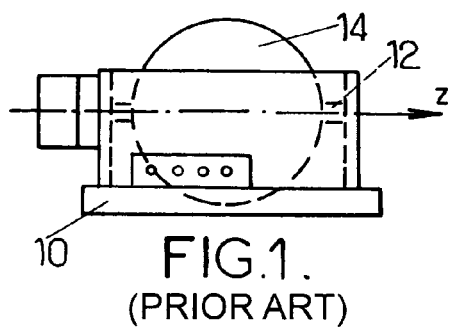
FIG. 1, already mentioned, is a sectional view through the axis of the gimbal of an actuator of known type.

In another variant, the relative arrangement of the motor 30 and of the bearing 18 is reversed with respect to that shown in FIG. 1. From a mechanical point of view, the arrangement in which a bearing of large diameter is arranged radially outside the motor is favorable from the mechanical point of view. However, on the other hand this arrangement leads to high initial friction on commencing operation, while the actuator is cold.

In yet another embodiment, the rotating commutator is placed at the same axial level as the motor and the bearing, radially inside them.

Yet other embodiments are possible. In particular for satellites of relatively small size and small weight (a few hundred kg), it may be appropriate to use yet thicker wheels than in the case of FIG. 5, thereby reducing the possibility of penetration.

In a general manner, it is desirable for the actuator to comply with the following conditions:
 the maximum diameter of the gimbal, in the zone closest to the axis of rotation of the wheel, is less than or equal to the diameter of the cylinder swept by the wheel during the rotation of the gimbal, but at the same time be greater than the thickness of the wheel,
 the diameter of the plinth, just where it is fixed to the platform of the satellite, is less than or at most equal to the maximum diameter of the support structure.

The invention claimed is:

1. A gyroscopic actuator comprising a wheel support structure mounted on a plinth by means for making it possible to rotate said structure about a first axis and carrying a wheel having a spinner and equipped with means for making it possible to drive said spinner at high speed about a second axis orthogonal to said first axis, wherein said support structure comprises a tubular piece rotating about said first axis on said plinth and a single flange located on only one side of said wheel and fixed on the one hand to said wheel and on the other hand to said tubular piece, said wheel having no corresponding flange on an opposite side of said wheel from said one side and being cantilevered by said single flange, said wheel having a diameter and a location of fixing said wheel to said flange which are proportioned in such a way that said wheel penetrates into said tubular piece along said first axis.

2. The actuator as claimed in claim 1, wherein said tubular piece exhibits a fraction in the shape of a truncated cone whose large base is fixed to said flange and a large diameter part of whose cone carries a rotor of a motor for orienting said support structure.

3. The actuator as claimed in claim 2, wherein said truncated cone is extended by a tubular part which carries in succession a rotating part of a bearing for mounting on said plinth, a rotating part of an angular coder and a part of means for transferring power and signals between said support structure and said plinth.

4. The actuator as claimed in claim 3, wherein said tubular part extending said cone exhibits cylindrical portions of diameters that decrease from the level of said bearing.

5. The actuator as claimed in claim 1, wherein said flange exhibits a part in the general shape of an angular fraction of a truncated cone having a wider end part fixed to said tubular piece and a narrower end part which carries said wheel.

6. The actuator as claimed in claim 1 , wherein said flange exhibits, on either side of a fraction having a truncated conical outside shape, a semicylindrical part for fixing said wheel and a rim for fixing onto said tubular piece.

7. The actuator as claimed in claim 1, wherein said flange exhibits internal ribs comprising at least two partitions disposed at 90° to one another, a first one facing said wheel, and the second one being perpendicular to the first one.

8. The actuator as claimed in claim 1, wherein said tubular piece rotates on said plinth by way of a bearing comprising two journals in contact with one another, consisting of rolling elements bearings having oppositely directed angles of contact.

9. The actuator as claimed in claim 1, wherein said tubular piece is made of a material which is a poor conductor of heat.

10. The actuator as claimed in claim 1, wherein said wheel also penetrates into said plinth, along said first axis.

11. The actuator as claims in claim 9, wherein said material is titanium.

12. A gyroscopic actuator comprising a wheel support structure mounted on a plinth by means for making it possible to rotate said structure about a first axis and carrying a wheel having a spinner and equipped with means for making it possible to drive said spinner at high speed about a second axis orthogonal to said first axis, wherein said support structure comprises a tubular piece rotating about said first axis on said plinth and a flange placed on one side of said wheel and fixed on the one hand to said wheel and on the other hand to said tubular piece, said wheel having a diameter and a location of fixing said wheel to said flange which are proportioned in such a way that said wheel penetrates into said tubular piece along said first axis, and wherein said tubular piece exhibits a fraction in the shape of a truncated cone whose large base is fixed to said flange and a large diameter part of whose cone carries a rotor of a motor for orienting said support structure.

13. The actuator as claimed in claim 12, wherein said truncated cone is extended by a tubular part which carries in succession a rotating part of a bearing for mounting on said plinth, a rotating part of an angular coder and a part of means for transferring power and signals between said support structure and said plinth.

14. A gyroscopic actuator comprising a wheel support structure mounted on a plinth by means for making it possible to rotate said structure about a first axis and carrying a wheel having a spinner and equipped with means for making it possible to drive said spinner at high speed about a second axis orthogonal to said first axis, wherein said support structure comprises a tubular piece rotating about said first axis on said plinth and a flange placed on one side of said wheel and fixed on the one hand to said wheel and on the other hand to said tubular piece, said wheel having a diameter and a location of fixing said wheel to said flange which are proportioned in such a way that said wheel penetrates into said tubular piece along said first axis, and wherein said flange exhibits a part in the general shape of an angular fraction of a truncated cone having a wider end part fixed to said tubular piece and a narrower end part which carries said wheel.

15. A gyroscopic actuator comprising a wheel support structure mounted on a plinth by means for making it possible to rotate said structure about a first axis and carrying a wheel having a spinner and equipped with means for making it possible to drive said spinner at high speed about a second axis orthogonal to said first axis, wherein said support structure comprises a tubular piece rotating about said first axis on said plinth and a flange placed on one side of said wheel and fixed on the one hand to said wheel and on the other hand to said tubular piece, said wheel having a diameter and a location of fixing said wheel to said flange which are proportioned in such a way that said wheel penetrates into said tubular piece along said first axis, wherein said flange exhibits, on either side of a fraction having a truncated conical outside shape, a semicylindrical part for fixing said wheel and a rim for fixing onto said tubular piece.

* * * * *